United States Patent [19]

Lehmann et al.

[11] Patent Number: 4,959,123
[45] Date of Patent: Sep. 25, 1990

[54] PROCESS FOR DEINKING PRINTED WASTE PAPER

[75] Inventors: Klaus Lehmann; Andreas Domsch, both of Illertissen; Hans Hawel, Voehringen, all of Fed. Rep. of Germany

[73] Assignee: Chemische Fabrik Gruenau GmbH, Illertissen, Fed. Rep. of Germany

[21] Appl. No.: 151,387

[22] Filed: Feb. 2, 1988

[30] Foreign Application Priority Data

Feb. 2, 1987 [DE] Fed. Rep. of Germany ....... 3702978

[51] Int. Cl.$^5$ .............................................. D12C 5/02
[52] U.S. Cl. ........................................... 162/5; 162/8
[58] Field of Search .................. 162/5, 8, 6; 252/311, 252/312

[56] References Cited

U.S. PATENT DOCUMENTS 4,376,011 3/1983 Menschhorn et al. ................. 162/5
4,586,982 5/1986 Poppel et al. ......................... 162/5

FOREIGN PATENT DOCUMENTS 2756711 5/1970 Fed. Rep. of Germany .......... 162/5
2903150 8/1980 Fed. Rep. of Germany .
3144387 5/1983 Fed. Rep. of Germany .
3123353 9/1984 Fed. Rep. of Germany .

*Primary Examiner*—Steve Alvo
*Attorney, Agent, or Firm*—Ernest G. Szoke; Wayne C. Jaeschke; Henry E. Millson, Jr.

[57] ABSTRACT

Process for deinking printed waste paper by treatment of the paper pulp in a pulper at alkaline pH values using alkali silicate, oxidative bleaches, higher fatty and/or resinic acids and dispersants and separation of the detached printing ink particles from the fiber suspension by flotation, the fatty and/or resinic acids being used in the form of their alkaline earth metal salts in fine distribution together with dispersants in an oil-in-water dispersion which is liquid at normal temperature.

12 Claims, No Drawings

PROCESS FOR DEINKING PRINTED WASTE PAPER

BACKGROUND OF THE INVENTION

1. Field of the Invention:

This invention relates to a process for deinking printed waste paper by treatment of the paper pulp in a pulper at alkaline pH values using alkali metal silicate, oxidative bleaches, higher fatty acids and/or resinic acids and dispersants and separation of the detached printing ink particles from the fiber suspension by flotation.

2. Statement of Related Art:

Deinking comprises the selective removal of printing inks from waste paper fiber suspensions. The reusable material thus obtained is processed to end products, such as for example writing paper, printing paper, toilet paper, etc., depending on the particular starting material.

Important steps in the deinking process are, first, the removal of the printing inks from the fibers in a pulper using suitable chemicals and, subsequently, their selective removal from the fiber suspension. Both in flotation deinking and in washing deinking, these steps are carried out in alkaline medium, the printing inks being removed in flotation cells or washers. The reuseable material obtained is then processed into the desired products.

A typically used chemical formulation may have the following composition (quantities based on the dry matter content of the waste paper):

0.5 to 2.0% by weight alkali metal hydroxide (100%)
0.2 to 1.5% by weight soap or fatty acid (100%)
0.05 to 0.1% by weight nonionic dispersant (100%)
2.0 to 5.0% by weight alkali metal silicate (waterglass)
0.1 to 0.3% by weight diethylenetriamine pentacetic acid, Na salt (DTPA) (40%)
0.5 to 3.0% by weight oxidative bleach (100%).

The mechanisms by which the individual chemical act in the flotation process are as follows:

Alkali metal hydroxide, preferably sodium hydroxide, softens the fibers and hence facilitates breaking up of the inter-fiber bonds and removal of the printing ink. Removal of the printing ink is additionally promoted by neutralization or saponification of printing ink binders. In addition, sodium hydroxide provides the alkalinity required to neutralize fatty acids which is essential to their function as collectors.

Nonionic dispersants improve wetting of the fibers by lowering the surface tension of the water, which promotes, inter alia, the effect of the other chemicals, and is largely responsible for the detachment of the printing inks and their dispersion. The dispersion of the printing inks prevents them from becoming, or makes it difficult for them to become, reattached to the fibers.

The detached pigments are hydrophobicized by the collectors, i.e. fatty acids or soaps, so that selective removal is possible. In addition to the alkaline medium, the salts responsible for the hardness of water are crucially important to this function where known anionic collectors are used, because it is only the calcium salts which hydrophobicize the printing ink particles and thus make them floatable. Oxidative bleaches prevent or compensate for the yellowing of the wood-containing waste paper and, in addition, also bleach the fibers, depending on the dosage used. The bleaches are stabilized by alkali metal silicate and DTPA which, by complexing the heavy metals, prevent overrapid decomposition of the bleach.

The waste paper used, depending on the desired end product, consists of newspapers, magazines, computer papers, files, etc., but in most cases mixtures thereof, deinkability being crucially determined by the printing ink systems used and their age.

Evaluation of the paper after the deinking process is based on whiteness measurement, the whiteness of the test sheet being compared with that of a standard (for example barium sulfate where whiteness is measured by the Elrepho system) and expressed in percent. For example, a waste paper moisture of daily newspapers and magazines in a ratio of 1:1 gives a whiteness of 56 to 60%, the whiteness of the unprinted margins of these waste papers being around 65 to 68%.

Published German application (DE-OS) No. 29 03 150 describes a process for deinking printed waste paper by treatment of the paper pulp in a pulper at alkaline pH values using alkali silicate, oxidative bleaches, higher fatty acids or salts thereof, and nonionic dispersants, with separation of the detached printing ink particles from the fiber suspension by flotation, a fatty acid alkanolamide additionally being used in the pulper.

By contrast, German Patent No. 31 23 353 describes a similar process which differs from the process disclosed in DE-OS No. 29 03 150 firstly in that no fatty acid alkanolamide is used in the pulper and secondly in that the fatty acids and/or resinic acids and the dispersants are added in the form of an oil-in-water emulsion.

However, these known processes are attended by certain disadvantages.

Where solid fatty acids are used as collectors, melting apparatus or heated storage vessels are required where the fatty acids are supplied in molten form.

There is no need for heating where the fatty acids used melt at temperatures below the normal temperature range, although fatty acids such as these are generally attended by disadvantages in terms of practical application.

Under the reaction conditions prevailing in the pulper, the relatively high melting and liquid fatty acids saponify only slowly, the soaps formed at the surface of the fatty acid particles complicating or preventing further saponification of the enclosed fatty acids. Not only does this result in a reduction in the collector effect, it can also lead to intensified fiber flotation because the fibers are hydrophobicized by the unsaponified fatty acids.

To overcome these disadvantages, the storage tanks used in the prior art are followed by saponification units. The resulting aqueous soap solutions thus have to be permanently "tempered" pending processing because they form gels at normal temperature, i.e. the intermediate storage vessels and also the metering pipes, including the metering head of the metering pumps, have to be heat-insulated and fully heated.

Where solid soaps are used, there is no need for a saponification unit. Since, in most cases, the soap granulates are not completely soluble under the process-dependent conditions, dissolving units have to be installed to prevent negative effects. The resulting soap solutions are then attended by the same disadvantages as described above.

Another significant disadvantage attending known processes lies in the fact that the above-discussed formation of calcium soaps of the fatty acids, which of course act as collectors, only takes place during the deinking process in the pulper with the hardness salts of the water used. The reaction time required for this purpose thus extends the overall process time. In addition, an incomplete reaction gives poorer deinking results which are reflected, for example, in reduced whiteness levels. These disadvantages also attend processes in which the fatty acids are used in the form of an emulsion.

DESCRIPTION OF THE INVENTION

Other than in the operating examples, or where otherwise indicated, all numbers expressing quantities of ingredients or reaction conditions used herein are to be understood as modified in all instances by the term "about".

By contrast, an object of the present invention is to provide an improved process for deinking printed waste paper which does not have any of the disadvantages discussed above and which, in addition, leads to better whiteness levels. More particularly, an object of the present invention is to develop a collector which enables solid fatty acids to be used as collectors without any need for melting units or heated storage vessels.

According to the invention, the objects stated above are achieved by using the fatty acids and/or resinic acids in the form of their alkaline earth metal salts in fine distribution together with dispersants in an oil-in-water dispersion which is liquid at normal temperatures.

Accordingly, the present invention relates to a process for deinking printed waste paper by
(a) treatment of the paper pulp in a pulper at alkaline pH values using alkali metal silicate, oxidative bleaches, higher fatty acids and/or resinic acids, dispersants and
(b) separation of the detached printing ink particles from the fiber suspension by flotation,
wherein the fatty acids and/or resinic acids are used in the form of their alkaline earth metal salts in fine distribution together with dispersants in an oil-in-water dispersion which is liquid at normal temperatures.

Suitable alkaline earth metal salts of fatty acids and/or resinic acids are, for example, the corresponding salts of magnesium, calcium, strontium, or barium, and mixtures thereof. However, the fatty acids and/or resinic acids are preferably used in the form of their calcium salts. Accordingly, where reference is made only to calcium salts in the following disclosure, it will be understood to also apply similarly to the other alkaline earth metal salts.

Accordingly, the process of the invention does not involve any reaction time for reaction with the alkali metal hydroxide of the chemical deinking liquor and the hardness salts of the water, which was essential to the function of the hitherto used anionic collectors based on fatty acids or soaps. Accordingly, the process of the invention also enables soft water to be used. The very fine distribution of the calcium salts and their product-specific properties guarantee an excellent collector effect which is reflected, inter alia, in improved whiteness levels.

The oil-in-water dispersions of calcium salts of the fatty and/or resinic acids can be directly introduced, i.e. without any pretreatment, from the storage tank into the deinking process at any point because a reaction is no longer necessary, so that the collector function is spontaneously performed. Accordingly, no disadvantages arise even where pulping is carried out in the high-consistency range at pulp densities of 15 to 20%. Introduction immediately before the deinking unit is also possible without any disadvantages.

By virtue of their increased surface activity, the oil-in-water dispersions of calcium salts of the fatty and/or resinic acids provide for excellent detachment and collection of the printing ink particles.

The lipophilic residue of the calcium salts of the fatty and/or resinic acids can consist of $C_8$–$C_{22}$ alkyl, alkenyl, hydroxyalkyl or hydroxyalkenyl radicals which may be linear, branched, even-numbered, odd-numbered or condensed-polycyclic. Mixtures of the above calcium salts of fatty and/or resinic acids can also be used. $C_{12}$–$C_{18}$ groups are preferred. Examples of fatty and/or resinic acids suitable for use in accordance with the invention are $C_{12}$–$C_{18}$ fatty acids either individually or in admixture, tallow fatty acid, palm oil fatty acid, synthetic fatty acids having acid values of 190 to 200, abietic acid, and, in particular, $C_{12}$–$C_{18}$ animal fatty acids.

Where "normal temperature" is mentioned in connection with the o/w dispersion, this is understood to include typical ambient or room temperatures which may extend for example from $+4°$ to $+30°$ C. The deinking process itself is preferably carried out at temperatures of 40° to 50° C. The o/w dispersions are of course also liquid at temperatures in that range.

The calcium salts of the fatty or resinic acids are present in the o/w dispersion in the fine distribution which is typical of, or required for, stable o/w dispersions.

Oil-in-water dispersions having a solids content of 10 to 50% by weight, based on the dispersion as a whole, are preferably used for the purposes of the invention. Solids contents of 35 to 40% by weight, based on the dispersion as a whole, are particularly preferred.

In another preferred embodiment of the invention, in the oil-in-water dispersions from 70 to 90% by weight of the above solids content is the calcium salt of the fatty and/or resinic acids.

The oil-in-water dispersions used in accordance with the invention also contain nonionic and/or anionic dispersants. Preferred are nonionic dispersants which are added to the dispersions during their preparation. The nonionic and/or anionic dispersants are preferably used in a quantity of 1 to 40% by weight, based on the calcium salts of the fatty and/or resinic acids. Where anionic dispersants are used, they are normally used in a quantity of 1 to 10% by weight, based on the calcium salts of the fatty and/or resinic acid in the dispersion.

Suitable nonionic dispersants are, for example, alkyl polyglycol ethers, isoalkyl polyglycol ethers, hydroxyalkyl polyglycol ethers, alkenyl polyglycol ethers, alkylaryl polyglycol ethers, acyl polyglycol esters and polyoxyethylene glycerol fatty acid esters, in each case containing 8 to 22 carbon atoms in the hydrocarbon radical and 6 to 30 moles of ethylene oxide.

Suitable anionic dispersants are, for example, alkyl sulfonates, alkylaryl sulfonates, alkyl sulfates, alkyl polyglycol ether sulfates, alkylaryl polyglycol ether sulfates and protein fatty acid condensates. The ethylene oxide content of the alkyl polyglycol ether sulfates and alkylaryl polyglycol ether sulfates is from 2 to 25 moles. These anionic dispersants contain $C_8$–$C_{22}$ hydrocarbon radicals. The anionic dispersants are normally used in the form of their alkali metal and/or amine salts.

To prepare the oil-in-water dispersions suitable for use in accordance with the invention, it is of advantage to react the fatty and/or resinic acids with a stoichiometric excess of calcium, preferably in the form of calcium hydroxide, in aqueous solution alkalized with sodium hydroxide, suitable nonionic and/or anionic dispersants being added to the solutions beforehand.

In one particular embodiment of the present invention, the process for deinking printed waste paper is carried out by using a combination of the following components in the pulper:
(a) 0.5 to 2% by weight sodium hydroxide (100%);
(b) 2 to 5% by weight alkali metal silicate;
(c) 0.1 to 0.3% by weight diethylenetriamine pentaacetic acid, sodium salt (DTPA) (40% aqueous solution);
(d) 0.5 to 3% by weight of an oxidative bleach, e.g. hydrogen peroxide (100%);
(e) 0.2 to 1.5% by weight oil-in-water dispersion of fatty acid and/or resinic acid calcium salts;
(f) 0 to 0.5% by weight nonionic dispersants,
these quantities all being based on the quantity of waste paper used.

In general, commercial waterglass solutions (soda and/or potash waterglasses) are used as the alkali metal silicates (component b). Soda waterglasses in which the ratio by weight of $SiO_2$ to $Na_2O$ is 3.3:1 are preferred. The oil-in-water dispersions used correspond to the criteria set forth above.

In addition to the dispersants which are present in the o/w dispersions, other nonionic dispersants (component f) may optionally be used in the process. The foregoing description of the nonionic dispersants used in preparing the o/w dispersions apply similarly to the type of nonionic dispersants which may be additionally used. It is preferred to use from 0.05 to 0.1% by weight nonionic dispersants, again based on waste paper; more especially $C_8$-$C_{22}$ alkyl polyglycol ethers and/or $C_8$-$C_{22}$ acyl polyglycol esters, in each case with 6 to 30 moles of ethylene oxide.

The invention is illustrated but not limited by the following Examples.

EXAMPLES 100 g bone-dry (110 g air-dry) printed waste paper consisting of 100% daily newspapers were introduced into 1890 ml of an aqueous chemical deinking liquor and pulped for 15 minutes at around 45° C. using a dispersion disc (2500 r.p.m.). The hardness of the water used was approximately 17° Gh.

The chemicals used and their concentrations were as follows, based in each case on the dry matter content of the waste paper:
1.0% sodium hydroxide (100%)
3.0% soda waterglass (ratio by weight $SiO_2$ to $Na_2O$ 3.3:1)
0.2% DTPA (commercial product, 40%)
0.85% hydrogen peroxide (100%)
0.7% collector.

The particular composition of the "collector" was varied and can be seen from the following Examples according to the invention and from the Comparison Examples.

The reaction time after pulping was 2 h, corresponding to the swelling time in the vats.

The 5% pulp suspension was then made up to 4000 ml with water having a hardness of approximately 17° Gh and deinked for 5 minutes.

In a laboratory flotation cell, the deinked pulp suspension was made up with water having the above hardness to the level of the froth overflow of the cell and subsequently floated for 10 minutes, the level being kept at the height of the froth overflow by addition of water.

The resulting reuseable material was then thickened to a pulp density of approximately 20%.

The thickened reuseable material was diluted to a pulp density of approximately 4% by addition of 800 ml water having a hardness of approximately 17° Gh, pulped and acidified to pH 6 with dilute sulfuric acid.

100 g of this pulp suspension were then made with water to 500 ml, producing a pulp density of approximately 0.8%, and filtered under suction through a filter paper ($\phi$12 cm).

The sheet thus formed was dried after smoothing.

Whiteness was measured with an Elrepho R 457.

EXAMPLE 1

The procedure was as described above using as collector 0.7% by weight of a calcium salt dispersion of which the composition was as follows:
60 parts animal $C_{12}$-$C_{18}$ fatty acid
12 parts $C_{18}$ alkyl polyglycol ether—20 EO
1.5 part sodium hydroxide
8.6 parts calcium hydroxide
123.5 parts water
whiteness: 59.1%.

EXAMPLE 2

The procedure was as described above using as collector 0.7% by weight of a calcium salt dispersion of which the composition was as follows:
60 parts animal $C_{12}$-$C_{18}$ fatty acid
9 parts $C_{18}$ alkyl polyglycol ether—20 EO
3 parts abietic acid polyglycol ester—85% EO (based on abietic acid)
1.5 parts sodium hydroxide
8.6 parts calcium hydroxide
123.5 parts water
whiteness: 59.0%

EXAMPLE 3

The procedure was as described above using as collector 0.7% by weight of a calcium salt dispersion of which the composition was as follows:
60 parts animal $C_{12}$-$C_{18}$ fatty acid
9 parts $C_{18}$ alkyl polyglycol ether—20 EO
3 parts polyoxyethylene glycerol $C_{16}$-$C_{18}$ fatty acid ester—20 EO
1.5 parts sodium hydroxide
8.6 parts calcium hydroxide
123.5 parts water
whiteness: 59.0%.

EXAMPLE 4

The procedure was as described above using as collector 0.7% by weight of a calcium salt dispersion of which the composition was as follows:
60 parts animal $C_{12}$-$C_{18}$ fatty acid
9 parts $C_{18}$ alkyl polyglycol ether—20 EO
3 parts $C_{12}$-$C_{18}$ alkyl sulfonate, Na salt
1.5 parts sodium hydroxide
8.6 parts calcium hydroxide
123.5 parts water
whiteness: 58.0%.

EXAMPLE 5

The procedure was as described above using as collector 0.7% by weight of a calcium salt dispersion of which the composition was as follows:
60 parts animal $C_{12}-C_{18}$ fatty acid
9 parts $C_{18}$ alkyl polyglycol ether—20 EO
3 parts $C_{12}$ alkyl sulfate, Na salt
1.5 parts sodium hydroxide
8.6 parts calcium hydroxide
123.5 parts water
whiteness: 58.1%.

EXAMPLE 6

The procedure was as described above using as collector 0.7% by weight of a calcium salt dispersion of which the composition was as follows:
60 parts tallow fatty acid
12 parts $C_{18}$ alkyl polyglycol ether—20 EO
1.5 parts sodium hydroxide
8.6 parts calcium hydroxide
123.5 parts water
whiteness: 59.1%

EXAMPLE 7

The procedure was as described above using as collector 0.7% by weight of a calcium salt dispersion of which the composition was as follows:
60 parts synthetic fatty acid (acid value 190—200)
12 parts $C_{18}$ alkyl polyglycol ether—20 EO
1.5 parts sodium hydroxide
8.6 parts calcium hydroxide
123.5 parts water
whiteness: 59.9%.

COMPARISON EXAMPLE 1

The procedure was as described above using as collector 0.7% by weight of a commercial deinking soap (sodium soap of $C_{10}-C_{18}$ fatty acids).
whiteness: 57.4%.

COMPARISON EXAMPLE 2

The procedure was as described above using as collector 0.7% by weight of a commercial emulsion of fatty acids and/or resinic acids containing more than 10 carbon atoms.
whiteness: 55.9%.

As the Comparison Examples corresponding to the prior art show, considerably better whiteness values are obtained where the process is carried out in accordance with the invention, taking into account the fact that, in practice, an increase in whiteness of only 1% represents a considerable improvement. In other words, the process carried out in accordance with the prior art gives overall poorer deinking results for the same process time. By contrast, immediate, selective flotation occurs in the process according to the invention, which is also reflected in the higher whiteness values.

We claim:

1. In a process for deinking printing waste paper pulp by treatment of the pulp with an alkaline solution containing an alkali metal silicate, an oxidative bleach, a dispersant, and either a higher fatty acid, a resinic acid or a mixture thereof, followed by separation of the resulting detached printing ink particles from the pulp fiber suspension by flotation, the improvement wherein the higher fatty acid, resinic acid, or mixture thereof is added to the solution in the form of a finely divided alkaline earth metal salt in an oil-in-water dispersion which is liquid at room temperatures.

2. The process of claim 1 wherein the oil-in-water dispersion also contains a dispersant.

3. The process of claim 1 wherein the alkaline earth metal salt is the calcium salt.

4. The process of claim 2 wherein the alkaline earth metal salt comprises a hydrophilic group and a lipophilic group, and the lipophilic group of the alkaline earth metal salt is a $C_8-C_{22}$ alkyl, alkenyl, hydroxyalkyl, hydroxyalkenyl, or mixture of two or more of such groups.

5. The process of claim 4 wherein the groups are linear, branched, condensed polycyclic, or mixtures thereof.

6. The process of claim 4 wherein the lipophilic group is a $C_{12}-C_{18}$ group.

7. The process of claim 1 wherein the oil-in-water dispersion has a solids content of from about 10 to about 50% by weight.

8. The process claim 7 wherein the solids content is from about 35 to about 40% by weight.

9. The process of claim 7 wherein from about 70 to about 90% by weight of the solids content is a calcium salt of a higher fatty acid, a resinic acid, or a mixture thereof.

10. The process of claim 7 wherein the oil-in-water dispersion contains from about 1 to about 40% by weight of either a nonionic, dispersant, an anionic dispersant, or a mixture of such dispersants, based on the weight of the alkaline earth metal salt.

11. The process of claim 2 wherein the dispersant is a nonionic dispersant in the oil-in-water dispersion which is one or more of an alkyl polyglycol ether, an isoalkyl polyglycol ether, an hydroxyalkyl polyglycol ether, an alkenyl polyglycol ether, an alkylaryl polyglycol ether, an acyl polyglycol ester, and a polyoxyethylene glycerol fatty acid ester, each of which contains from 8 to 22 carbons in the hydrocarbon radical and from 6 to 30 moles of ethylene oxide.

12. The process of claim 2 wherein the dispersant in the oil-in-water dispersion is an anionic dispersant which is one or more of an alkyl sulfonate, an alkylaryl sulfonate, an alkyl sulfate, an alkyl polyglycol ether sulfate containing 2 to 25 moles of ethylene oxide, an alkylaryl polyglycol ether sulfate containing 2 to 25 moles of ethylene oxide, and a protein fatty acid condensate, each of which contains from 8 to 22 carbon atoms in the hydrocarbon radical, and each of which is present in the form of its alkali metal salt, its amine salt, or a mixture of such salts.

* * * * *